United States Patent [19]
Brown et al.

[11] Patent Number: 5,436,507
[45] Date of Patent: Jul. 25, 1995

[54] HYDROELECTRIC PLANT DRAFT TUBE WATER LEVEL CONTROL

[76] Inventors: Joseph G. Brown, P.O. Box 272683, Fort Collins, Colo. 80527; Richard E. Boisclaire, 290 Mobile Dr., Ashland, Oreg. 97520

[21] Appl. No.: 212,116

[22] Filed: Mar. 14, 1994

Related U.S. Application Data

[63] Continuation-in-part of Ser. No. 994,933, Dec. 22, 1992, abandoned.

[51] Int. Cl.$^6$ ............... F03B 15/16; F01D 15/10
[52] U.S. Cl. ........................... 290/52; 290/43; 290/54
[58] Field of Search ............... 290/43, 52, 54; 415/1, 415/24

[56] References Cited

U.S. PATENT DOCUMENTS

| | | | |
|---|---|---|---|
| 4,346,304 | 8/1982 | Tsunoda et al. | 290/52 |
| 4,674,279 | 6/1987 | Ali et al. | 290/52 |

Primary Examiner—Marc S. Hoff
Assistant Examiner—Robert Lloyd Hoover

[57] ABSTRACT

A control system for synchronous condensing operation of a hydroelectric turbine-generator wherein the draft tube water level for the turbine is controlled through the use of that generator's power or current consumption. Either parameter may be used in the process. Water impacting the turbine will increase both of these parameters above an optimum minimum value. Either a generator power or current device provides a signal to a control circuit. When the signal from either device exceeds a preset value, the control circuit injects compressed air into the turbine cavity until the signal returns to its optimum value.

6 Claims, 2 Drawing Sheets

HYDROELECTRIC PLANT DRAFT TUBE WATER LEVEL CONTROL This specification is a Continuation in Part of application Ser. No. 07/994,933 filed on Dec. 22, 1992 now abandoned.

BACKGROUND OF THE INVENTION

The invention relates to the art of controls of hydroelectric power plants and more particularly to a new and improved system for the control of the draft tube water level when a turbine-generator is used as a synchronous condenser.

When a hydroelectric turbine-generator is used as a synchronous condenser, the high pressure water used to drive the unit as a generator is shut off, but the circuit breaker connecting it to the utility's electrical grid remains closed. To keep the power consumption of the turbine-generator at a minimum it is necessary to insure that the turbine is spinning in air above the water level of the draft tube at all times. The turbine elevation is often below the river or tailrace level. In this situation air pressure in the turbine cavity must be established and maintained at all times during condensing operation. This air pressure will gradually dissipate because of packing leakage. Therefore, after initial establishment of the air cushion in the turbine cavity, it must be periodically replenished with more air.

Maintenance of the correct water level in the draft tube is critical because power consumption swings, electric power system instability, and reduced plant efficiency will result from the loss of the draft tube air cushion.

All methods currently in use to control the draft tube water level have one thing in common. The process is controlled by devices deriving their logic from the draft tube or the turbine cavity. These methods sense the water level, or the pressure, directly at the draft tube or in the turbine cavity. These methods are not always dependable and require frequent maintenance. It would be highly desirable to provide a dependable and simple control system to maintain the water level in the draft tube.

The subject invention uses either the power or current consumption parameters of the generator for control of air injection into the turbine cavity thereby controlling draft tube water level.

SUMMARY OF THE INVENTION

It is, therefore, a primary object of this invention to provide a new and improved control system for the operation of a hydroelectric generator during synchronous condenser operation. It is a further object of this invention to provide such a control, whereby at all times, after initial establishment of the air cushion in the turbine and draft tube areas, that the energy required to operate the generator remains virtually constant at the absolute minimum necessary to keep the generator turning as a synchronous condenser.

It is a further object of this invention to provide such a control whereby the plant efficiency and power system stability is improved.

It is a further object of this invention to provide a control which does not require frequent maintenance, cleaning, or calibration.

The present invention provides a control system for synchronous condensing of a hydroelectric generator using minute increases in either generator power, or current, consumption above optimum preset levels. These increases are caused by draft tube water impacting the turbine as the water level rises due to air seepage around the turbine or wicket gate packing. The foregoing is used to determine when to inject compressed air into the turbine cavity to maintain correct draft tube water level. The control system begins to inject compressed air when the selected generator parameter exceeds a setpoint and continues to inject air for a short time after the sensed parameter returns to its optimum level. The short additional time that air is injected is used to prevent rapid cycling of the control system. This same control system will establish the draft tube water level below the turbine efficiently when the generator is transferred from the generate mode to the condense mode.

DESCRIPTION OF THE PREFERRED EMBODIMENTS

Figure 1:
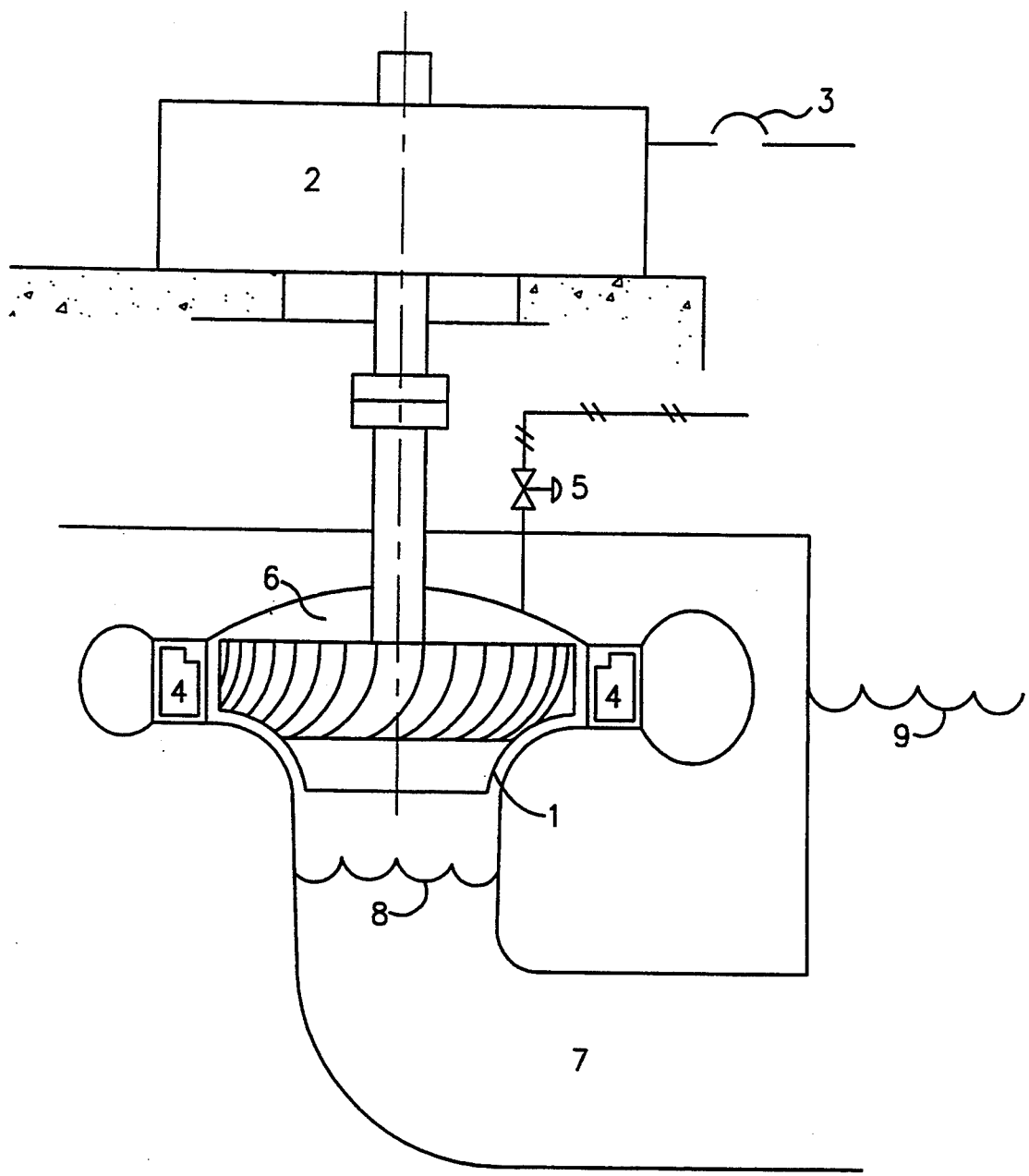
FIG. 1 is a side view, partly in section, showing a hydropowered turbine-generator to which the control system of the present invention is applicable.

FIG. 1 illustrates a vertical shaft hydropowered turbine-generator which can be used either as a generator or as a synchronous condenser. Illustrated is a hydropowered turbine-generator consisting of a turbine 1 directly coupled to a generator which is in turn connected to an electric utility power system through a unit circuit breaker 3, wicket gates 4 for the control of water to the turbine 1, an electrically-operated compressed air inlet valve 5 for the purpose of injecting air into the turbine cavity 6, a draft tube 7 connected directly below said turbine cavity 6. The draft tube water level 8 is depicted as lower in elevation than the tailwater level 9.

Figure 2:
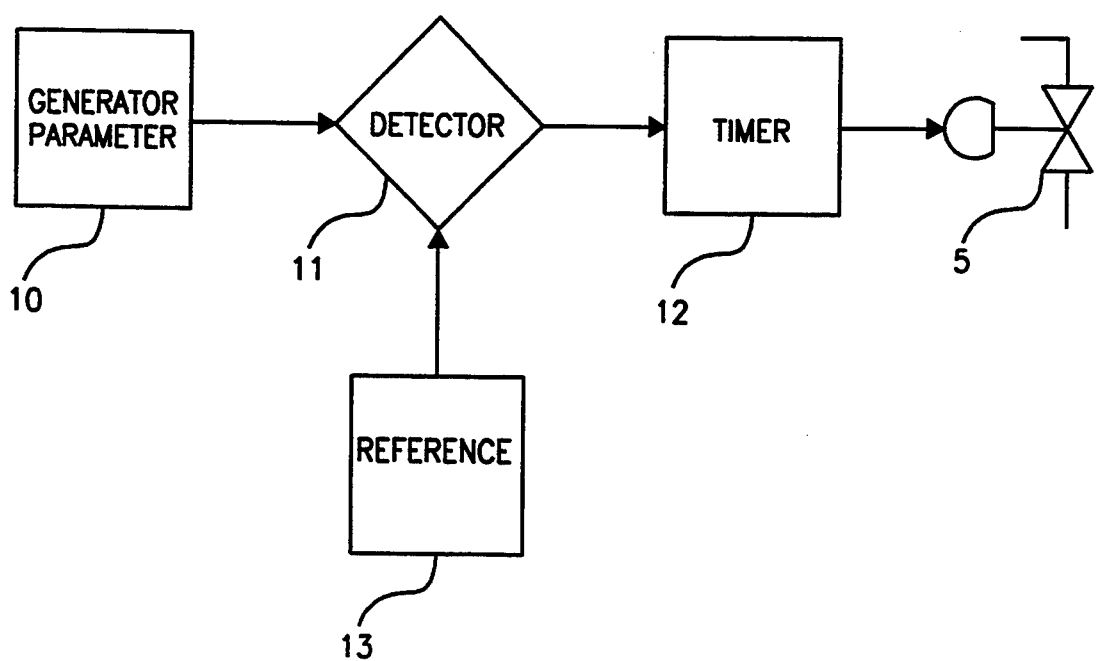
FIG. 2 is a schematic block diagram of the control system of the present invention showing interconnections to a turbine-generator.

The control system of the present invention is shown in the block diagram of FIG. 2. During synchronous condenser operation the selected generator parameter 10 is monitored by detector 11. The selected generator parameter 10 may be either the generator power in watts or the generator current.

When the turbine 1 is rotating in air, during synchronous condenser operation, the signal level of the selected generator parameter 10 must be determined for whichever selected generator parameter is to be used for the control process. The detector 11 enables a timer 12 whenever the selected generator parameter 10 exceeds the reference level setpoint 13.

The reference level setpoint 13 is an adjustable reference signal approximately 5% greater in magnitude than the selected generator parameter 10 level signal when said generator is rotating with its turbine in air.

When the detector 11 determines that the selected generator parameter 10 has decreased below the reference level setpoint 13, the timer 12 will continue to hold the air valve 5 open for the timer's programmed time interval.

The transistion of the generator from the generate mode to the synchronous condenser mode will now be described with reference to FIGS. 1 and 2. When the machine is used as a generator, the wicket gates 4 are opened to whatever degree is necessary to supply the power required from the machine through the unit circuit breaker 3 to the utility power grid.

To change operation of the turbine-generator, from the generate mode to the synchronous condenser mode, the wicket gates 4 are closed. This mode change results in high power and current consumption by the generator 2 because the turbine 1 is rotating at synchronous speed while submerged in water. The detector 11 is enabled at this time. Since the selected generator parameter 10, being monitored by the detector 11 is greater than the reference level setpoint 13, the detector 11 will enable the timer 12. The timer 12 will open the air valve 5. Compressed air will be injected into the turbine cavity 6. The air valve 5 will remain opened until the detector 11 observes that the selected generator parameter 10 has decreased to a level below that of the reference level setpoint 13. At this point the detector 11 disables the timer 12. After the programmed time interval on timer 12 expires, the air valve 5 closes. At this time the turbine 1 will be rotating in the air cushion above the draft tube water level 8.

The draft tube water level 8 has been depressed below the turbine 1 by a height dependent on the programmed time interval of timer 12. As the air cushion in the turbine cavity 6 gradually dissipates, because of packing leakage around the wicket gates 4 and the turbine shaft, the draft tube water level 8 will rise and eventually impact the turbine 1. This event will result in a sudden, but minute, increase in the selected generator parameter 10. The detector 11 determines that the selected generator parameter 10 has exceeded the reference level setpoint 13. The detector 11 enables the timer 12 and the timer 12 then opens the air valve 5. The air valve 5 will be held open by the timer 12 for the programmed time interval after the detector 11 has determined that the selected generator parameter 10 has decreased below the reference level setpoint 13. The draft tube water level 8 is again depressed below the turbine 1 by a height dependent on the programmed time interval. The process repeats itself indefinitely.

Therefore it is apparent that the present invention accomplishes its intended objectives.

We claim:

1. In a vertical shaft hydropowered turbine-generator having a generator directly coupled to a turbine, which is disposed in a turbine cavity, a draft tube connected directly below said turbine cavity, wicket gates disposed around said turbine cavity, an air supply valve for the injection of compressed air to depress the water level in the draft tube when the turbine generator is operated as a synchronous condenser, a control system for synchronous condenser operation comprising:

(a) means operatively connected to said generator for sensing the electrical power consumed by the generator when operating as a synchronous condenser and for producing a signal indicative thereof;

(b) reference means providing a signal representative of the electrical power consumed by the generator at the instant that rising draft tube water begins to impact said turbine during synchronous condenser operation; and (c) a detector, operatively connected to said generator electrical power sensing means, said reference means, and connected in a controlling relation to said air supply valve for controlled injection of compressed air in response to an increase in said generator electrical power consumption above a threshold level represented by the reference means to depress the draft tube water level below the level of the turbine.

2. In a vertical shaft hydropowered turbine-generator having a generator directly coupled to a turbine, which is disposed in a turbine cavity, a draft tube connected directly below said turbine cavity, wicket gates disposed around said turbine cavity, an air supply valve for the injection of compressed air to depress the water level in the draft tube when the turbine generator is operated as a synchronous condenser, a control system for synchronous condenser operation comprising:

(a) means operatively connected to said generator for sensing the electrical current drawn by the generator when operating as a synchronous condenser and for producing a signal indicative thereof;

(b) reference means operatively connected to provide a signal representative of the electrical current drawn by the generator at the instant that draft tube water begins to impact the turbine during synchronous condenser operation; and (c) a detector, operatively connected to said generator current sensing means, said reference means, and connected in a controlling relation to said air supply valve for controlled injection of compressed air in response to an increase in said generator current consumption above a threshold level represented by the reference means to depress the draft tube water level below the level of the turbine.

3. The control system as set forth in claim 1 including a timer operatively connected between the detector and the air supply valve for controlling the period of air injection after initiation by said detector.

4. The control system as set forth in claim 3 wherein the predetermined interval of the timer determines the distance by which the water level is depressed below the level of the turbine.

5. The control system as set forth in claim 2 including a timer operatively connected between the detector and the air supply valve for controlling the period of air injection after initiation by said detector.

6. The control system as set forth in claim 5 wherein the predetermined interval of the timer determines the distance by which the water level is depressed below the level of the turbine.

* * * * *